106. COMPOSITIONS, COATING OR PLASTIC
82
Patented Oct. 13, 1925.

1,556,714

UNITED STATES PATENT OFFICE.

RICHARD V. RIDGELY, OF CUMBERLAND, MARYLAND.

COMPOSITION FOR PREVENTING ACCUMULATION OF MOISTURE.

No Drawing.   Application filed August 20, 1924.   Serial No. 733,233.

*To all whom it may concern:*

Be it known that I, RICHARD V. RIDGELY, a citizen of the United States, residing at Cumberland, in the county of Allegany and State of Maryland, have invented certain new and useful Improvements in Compositions for Preventing Accumulation of Moisture, of which the following is a specification.

This invention has as its object to provide a novel and highly efficient composition for application to the glass panes of wind shields on automobiles or to any other glass panes, exposed to the elements, for the purpose of preventing the accumulation of rain, mist, snow and sleet upon the exposed surface thereof so that the pane, in inclement weather, will remain as transparent as though not exposed to the elements.

Another object of the invention is to provide a composition, in paste form, which may be conveniently applied to the exposed surface of the wind shield panes in such a manner as to form upon the pane an invisible film of the composition.

The composition embodying the invention consists of an intimate mixture of the following ingredients in approximately the proportions stated:—

| | |
|---|---|
| Soap | 10 ounces av. |
| Glycerine | 2 ounces av. |
| Water glass | 2 ounces av. |
| Water | 5 to 15 fluid ounces. |
| Methyl violet | 10 to 30 drops. |
| Oil of cloves | 10 to 30 drops. |

In preparing the composition, the above mentioned ingredients are thoroughly mixed, the quantity of water employed varying as indicated above, and such quantity being used as will render the prepared composition of a pasty consistency so that a suitable portion thereof may be taken up on a piece of cloth and rubbed over the exposed surface of the windshield glass, after the glass has been previously cleaned to remove dust and dirt therefrom.

Soap is employed in the composition for the purpose of removing any oily or greasy accumulations from the surface of the glass which might be left remaining after the preparatory cleaning of the glass, and also to assist in giving body to the composition. Glycerine, as is well known, serves to prevent the accumulation of water, moisture, mist, snow and sleet, upon a glass surface to which it is applied, and it serves this function in the present composition, and likewise as a medium to prevent caking or hardening of the composition and thus cause the same to maintain its pasty consistency. The water glass is likewise employed for the purpose of maintaining the original consistency of the composition, and it serves the further purpose of adhering to the glass surface to which the composition is applied, to a sufficient degree to insure of a thin and substantially invisible film of the composition being retained upon the surface of the glass for an indefinite period of time. The incorporation of a suitable volume of water in the composition serves the purpose of partially dissolving the soap and likewise constitutes a medium whereby the consistency of the composition may be varied until the desired pastiness is obtained. The methyl violet and the oil of cloves are employed respectively as coloring and scent imparting mediums.

In the use of the composition, a suitable quantity thereof is applied over the exposed surface of the wind shield or other glass pane, as thinly as possible, and the excess quantity of the composition is then removed by rubbing the surface of the glass with a cloth. This latter step, however, does not completely remove the composition for due to the presence of the water glass therein, a thin and substantially invisible film of the composition is left upon the surface without in any way impairing the transparency of the glass pane.

It will be understood of course that I am not to be restricted to the precise formula above outlined, but may employ equivalent ingredients and may vary the proportions of the ingredients within reasonable limits.

Having thus described the invention, what I claim is:

1. A coating paste to prevent the accumulation of moisture upon the exposed surface of glass panes comprising a mixture of soap, glycerine, water glass, and water.

2. A coating paste to prevent the accumulation of moisture upon the exposed surface of glass panes comprising a mixture of soap, glycerine, water glass, and water, in about the proportions of soap ten ounces av., glycerine two ounces av., water glass two ounces av., and water from five to fifteen fluid ounces.

In testimony whereof I affix my signature.

RICHARD V. RIDGELY. [L. S.]